(12) United States Patent
Grieve et al.

(10) Patent No.: US 7,160,342 B2
(45) Date of Patent: *Jan. 9, 2007

(54) FUEL REFORMER SYSTEM

(75) Inventors: M. James Grieve, Fairport, NY (US);
Karl Haltiner, Jr., Fairport, NY (US);
Peter Hendler, Rochester, NY (US);
John Noetzel, Fairport, NY (US)

(73) Assignee: Delphi Technologies, Inc., Troy, MI (US)

( * ) Notice: Subject to any disclaimer, the term of this patent is extended or adjusted under 35 U.S.C. 154(b) by 868 days.

This patent is subject to a terminal disclaimer.

(21) Appl. No.: 09/782,619

(22) Filed: Feb. 13, 2001

(65) Prior Publication Data

US 2002/0108309 A1 Aug. 15, 2002

(51) Int. Cl.
*C10B 3/24* (2006.01)
*C10B 3/32* (2006.01)
*B01J 8/04* (2006.01)

(52) U.S. Cl. .................. 48/198.1; 48/127.9; 48/198.7; 48/198.8; 48/214 A; 422/211; 422/222

(58) Field of Classification Search ............... 48/127.9, 48/212, 118.5, 215, 198.1, 198.7, 198.8, 214 A; 422/110, 190, 198, 199, 211, 222
See application file for complete search history.

(56) References Cited

U.S. PATENT DOCUMENTS

| | | | |
|---|---|---|---|
| 4,391,794 A | 7/1983 | Silberring | |
| 5,554,454 A | 9/1996 | Gardner et al. | |
| 5,858,314 A | 1/1999 | Hsu et al. | |
| 5,968,680 A | 10/1999 | Wolfe et al. | |
| 6,423,896 B1 | 7/2002 | Keegan | |
| 6,464,947 B1 | 10/2002 | Balland | |
| 6,481,641 B1 | 11/2002 | Mieney | |
| 6,485,852 B1 | 11/2002 | Miller et al. | |
| 6,562,496 B1 * | 5/2003 | Faville et al. | 429/13 |
| 6,562,502 B1 | 5/2003 | Haltiner, Jr. | |
| 6,608,463 B1 | 8/2003 | Kelly et al. | |
| 6,915,869 B1 * | 7/2005 | Botti et al. | 180/65.3 |
| 6,929,785 B1 * | 8/2005 | Grieve et al. | 422/199 |
| 2002/0081471 A1 * | 6/2002 | Keegan et al. | 429/25 |
| 2004/0200209 A1 * | 10/2004 | Kirwan et al. | 60/284 |

FOREIGN PATENT DOCUMENTS

| | | | |
|---|---|---|---|
| DE | 19906672 | | 8/2000 |
| EP | 1047144 | | 10/2000 |
| EP | 1 231 183 | * | 8/2002 |
| EP | 1 231 184 | * | 8/2002 |

* cited by examiner

*Primary Examiner*—N. Bhat
(74) *Attorney, Agent, or Firm*—Paul L. Marshall

(57) ABSTRACT

A method of main reformer startup is disclosed. The method comprises introducing a first supply of fuel and a first supply of air into a micro-reformer. The first supply of fuel is increased to produce a heated reformate in the micro-reformer. The heated reformate is directed through a main reformer in order to heat the main reformer. At least a portion of the heated reformate is burned in the main reformer. A second supply of fuel and a second supply of air is introduced into the main reformer to produce a main supply of reformate. A method for maintaining a vehicle device in standby condition is also disclosed.

12 Claims, 1 Drawing Sheet

FUEL REFORMER SYSTEM

BACKGROUND

Alternative transportation fuels have been represented as enablers to reduce toxic emissions in comparison to those generated by conventional fuels. At the same time, tighter emission standards and significant innovation in catalyst formulations and engine controls has led to dramatic improvements in the low emission performance and robustness of gasoline and diesel engine systems. This has certainly reduced the environmental differential between optimized conventional and alternative fuel vehicle systems. However, many technical challenges remain to make the conventionally fueled internal combustion engine a nearly zero emission system having the efficiency necessary to make the vehicle commercially viable.

Alternative fuels cover a wide spectrum of potential environmental benefits, ranging from incremental toxic and carbon dioxide ($CO_2$) emission improvements (reformulated gasoline, alcohols, etc.) to significant toxic and $CO_2$ emission improvements (natural gas, etc.). Hydrogen has the potential as a nearly emission free internal combustion engine fuel (including $CO_2$ if it comes from a non-fossil source).

The automotive industry has made very significant progress in reducing automotive emissions. This has resulted in some added cost and complexity of engine management systems, yet those costs are offset by other advantages of computer controls: increased power density, fuel efficiency, drivability, reliability and real-time diagnostics.

Future initiatives to require zero emission vehicles appear to be taking us into a new regulatory paradigm where asymptotically smaller environmental benefits come at a very large incremental cost. Yet, even an "ultra low emission" certified vehicle can emit high emissions in limited extreme ambient and operating conditions or with failed or degraded components.

One approach to addressing the issue of emissions is the employment of fuel cells, particularly solid oxide fuel cells (SOFC), in an automobile. A fuel cell is an energy conversion device that generates electricity and heat by electrochemically combining a gaseous fuel, such as hydrogen, carbon monoxide, or a hydrocarbon, and an oxidant, such as air or oxygen, across an ion-conducting electrolyte. The fuel cell converts chemical energy into electrical energy. A fuel cell generally consists of two electrodes positioned on opposite sides of an electrolyte. The oxidant passes over the oxygen electrode (cathode) while the fuel passes over the fuel electrode (anode), generating electricity, water, and heat.

A SOFC is constructed entirely of solid-state materials, utilizing an ion conductive oxide ceramic as the electrolyte. A conventional electrochemical cell in a SOFC is comprised of an anode and a cathode with an electrolyte disposed therebetween. In a typical SOFC, a fuel flows to the anode where it is oxidized by oxygen ions from the electrolyte, producing electrons that are released to the external circuit, and mostly water and carbon dioxide are removed in the fuel flow stream. At the cathode, the oxidant accepts electrons from the external circuit to form oxygen ions. The oxygen ions migrate across the electrolyte to the anode. The flow of electrons through the external circuit provides for consumable or storable electrical power. However, each individual electrochemical cell generates a relatively small voltage. Higher voltages are attained by electrically connecting a plurality of electrochemical cells in series to form a stack.

The fuel cell stack also includes conduits or manifolds to allow passage of the fuel and oxidant into the stack, and byproducts, as well as excess fuel and oxidant, out of the stack. Generally, oxidant is fed to the structure from a manifold located on one side of the stack, while fuel is provided from a manifold located on an adjacent side of the stack. The fuel and oxidant are generally pumped through the manifolds and introduced to a flow field disposed adjacent to the appropriate electrode. The flow fields that direct the fuel and oxidant to the respective electrodes typically create oxidant and fuel flows across the electrodes that are perpendicular to one another.

The long term successful operation of a fuel cell depends primarily on maintaining structural and chemical stability of fuel cell components during steady state conditions, as well as transient operating conditions such as cold startups and emergency shut downs. The support systems are required to store and control the fuel, compress and control the oxidant and provide thermal energy management. A SOFC can be used in conjunction with a reformer that converts a fuel to hydrogen and carbon monoxide (the reformate) usable by the fuel cell. Three types of reformer technologies are typically employed (steam reformers, dry reformers, and partial oxidation reformers) to convert hydrocarbon fuel (methane, propane, natural gas, gasoline, etc) to hydrogen using water, carbon dioxide, and oxygen, respectfully, with byproducts including carbon dioxide and carbon monoxide, accordingly. These reformers operate at high temperatures (e.g., about 800° C. or greater). At lower temperatures, e.g., during start-up, deposition of carbon (or soot) upon the catalyst can adversely affect the reformer efficiency and reduce reformer life. Major requirements for the reformers are rapid start, dynamic response time, fuel conversion efficiency, size, and weight.

Since rapid start-up and shut down cycles are typical in automobile applications and the fuel supply must in turn be supplied rapidly and at the proper temperature, hydrogen-rich gas has been provided from stored gas cylinders. However, storage of gas cylinders in the proximity of fuel cells requires a large amount of space. This proves to be very expensive because of the higher gas costs, cylinder leasing expenses, and transportation expenses.

SUMMARY

The drawbacks and disadvantages of the prior art are overcome by the fuel reformer system.

A method of main reformer startup is disclosed. The method comprises introducing a first supply of fuel and a first supply of air into a micro-reformer. The first supply of fuel is increased to produce a heated reformate in the micro-reformer. The heated reformate is directed through a main reformer in order to heat the main reformer. At least a portion of the heated reformate is burned in the main reformer. A second supply of fuel and a second supply of air is introduced into the main reformer to produce a main supply of reformate.

A method for maintaining a vehicle device in standby condition is disclosed. The method comprises introducing a supply of fuel and a supply of air into a micro-reformer. The supply of fuel is increased to produce a heated reformate in the micro-reformer. At least a portion of the heated reformate is passed through the vehicle device. The vehicle device is maintained at a standby temperature.

The above described and other features are exemplified by the following figures and detailed description.

BRIEF DESCRIPTION OF THE DRAWINGS

Referring now to the figures wherein like elements are numbered alike.

DESCRIPTION OF THE PREFERRED EMBODIMENT

To meet the needs of automobiles, fuel cells need to rapidly start, requiring an immediate source of fuel. Conventional fuels, such as gasoline, need to be reformed into acceptable SOFC fuels, such as hydrogen and carbon monoxide. The reforming process pretreats the fuel for efficient use by the fuel cell system. Since different types of fuel cell systems exist, including tubular or planar, any reference to components of a particular cell configuration are intended to also represent similar components in other cell configurations where applicable.

Figure 1:
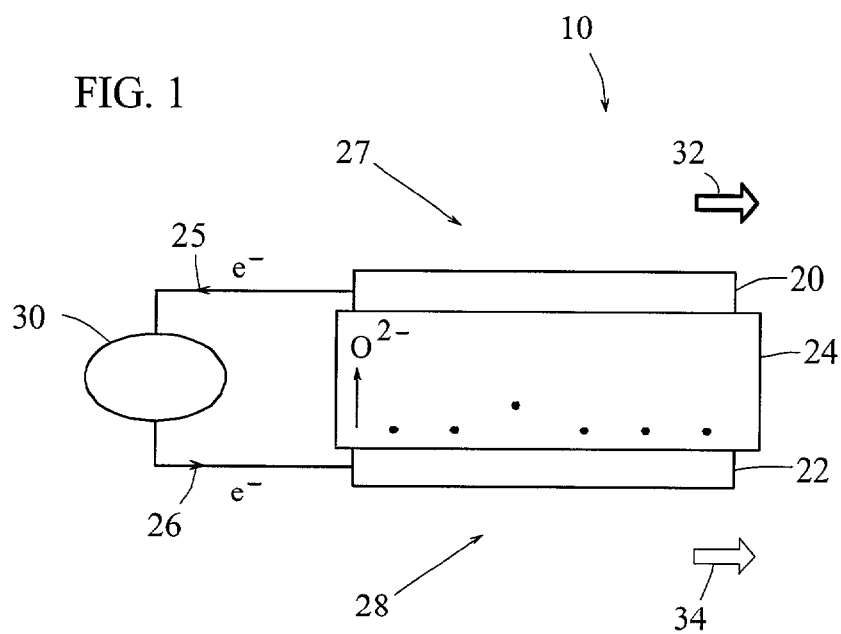
FIG. 1 is a schematic of an exemplary electrochemical cell of a SOFC in operation.

One configuration of a fuel cell includes a stack of planar SOFC, with an electrochemical cell 10 of a stack, illustrated in FIG. 1. A fuel electrode (or anode) 20 and an oxygen electrode (or cathode) 22 are disposed on opposite sides of a solid electrolyte 24 to form an electrochemical cell 10. In operation, the electrochemical cell 10 produces a flow of electrons as illustrated by electron flow arrows 25, 26. Oxidant gases, such as oxygen or air, can be introduced to the cathode side of the cell, flowing as illustrated by the oxidant flow arrow 27. The oxidant receives the flowing electrons ($e^-$) and converts them into oxygen ions ($O^{-2}$), which diffuse through the electrolyte 24 to the anode 20, as depicted in the following reaction:

$$O_2 + 4e^- \rightarrow 2O^{-2}$$

At the anode, the oxygen ions react with a fuel, such as hydrogen, carbon monoxide, or methane, which was introduced to the electrochemical cell 10 as illustrated by the fuel flow arrow 28. The reaction of the fuel and oxygen ions, producing electrons ($e^-$), which flow from the electrochemical cell 10 to the external circuit 30 to produce the electrical load and back to the cathode 22. The fuel/oxygen ion reaction is depicted in the following reactions:

| | |
|---|---|
| $H_2 + O^{-2} \rightarrow H_2O + 2e^-$ | [when fuel is hydrogen] |
| $CO + O^{-2} \rightarrow CO_2 + 2e^-$ | [when fuel is carbon monoxide] |
| $CH_4 + 4O^{-2} \rightarrow 2H_2O + CO_2 + 8e^-$ | [when fuel is methane] |

Unreacted fuel and byproducts, such as water, carbon monoxide, and carbon dioxide, exit the electrochemical cell 10 in the fuel stream, as illustrated by fuel stream arrow 32, while excess oxidant exits the electrochemical cell 10, as illustrated by oxidant stream arrow 34. Thermal energy is also a byproduct that exits the electrochemical cell 10 in the fuel steam 32.

Basically, the electrolyte 24 conducts these oxygen ions ($O^{-2}$) between the anode 20 and the cathode 22, maintaining an overall electrical charge balance. The cycle of flowing electrons ($e^-$) from the anode 20 through the external circuit 30 to the cathode 22 creates electrical energy. This electrical energy, electrical power, can be directly utilized by the vehicle to power various electrical devices, including, but not limited to, lights, resistive heaters, blowers, air conditioning compressors, starter motors, traction motors, computer systems, radio/stereo systems, and a multiplicity of sensors and actuators, among others.

To facilitate the reaction in the fuel cell, a direct supply of the fuel, such as hydrogen, carbon monoxide, or methane, is preferred. However, concentrated supplies of these fuels are generally expensive and difficult to supply. Therefore, the specific fuel can be supplied by processing a more complex source of the fuel. The fuel utilized in the system is typically chosen based upon the application, expense, availability, and environmental issues relating to the fuel. Possible sources of fuel include conventional fuels such as hydrocarbon fuels, including, but not limited to, conventional liquid fuels, such as gasoline, diesel, ethanol, methanol, kerosene, and others; conventional gaseous fuels, such as natural gas, propane, butane, and others; and alternative fuels, such as hydrogen, biofuels, dimethyl ether, and others; and synthetic fuels, such as synthetic fuels produced from methane, methanol, coal gasification or natural gas conversion to liquids, and combinations comprising at least one of the foregoing methods, and the like; and combinations comprising at least one of the foregoing fuels. The preferred fuel is typically based upon the power density of the engine, with lighter fuels, i.e. those which can be more readily vaporized and/or conventional fuels which are readily available to consumers, generally preferred.

The processing or reforming of hydrocarbon fuels, such as gasoline, is completed to provide an immediate fuel source for rapid start up of the fuel cell as well as protecting the fuel cell by removing impurities. Fuel reforming can be used to convert a hydrocarbon (such as gasoline) or an oxygenated fuel (such as methanol) into hydrogen ($H_2$) and byproducts (e.g. carbon monoxide (CO) and carbon dioxide ($CO_2$)). Common approaches include steam reforming, partial oxidation, and dry reforming. Both steam reforming and dry reforming are endothermic processes, while partial oxidation is an exothermic process.

Steam reforming systems involve the use of a fuel and steam ($H_2O$) that is reacted in heated tubes filled with catalysts to convert the hydrocarbons into principally hydrogen and carbon monoxide. An example of the steam reforming reaction is as follows:

$$CH_4 + H_2O \rightarrow CO + 3H_2$$

Partial oxidation reformers are based on substoichiometric combustion to achieve the temperatures necessary to reform the hydrocarbon fuel. Decomposition of the fuel to primarily hydrogen and carbon monoxide occurs through thermal reactions at high temperatures of about 600° C. to about 1,200° C., and preferably, about 700° C. to about 1,050° C. The heat required to drive the reaction is typically supplied by burning a portion of the fuel. Catalysts have been used with partial oxidation systems (catalytic partial oxidation) to promote conversion of various low sulfur fuels into synthesis gas. The use of a catalyst can result in acceleration of the reforming reactions and can provide this effect at lower reaction temperatures than those that would otherwise be required in the absence of a catalyst. An example of the partial oxidation reforming reaction is as follows:

$$CH_4 + \tfrac{1}{2}O_2 \rightarrow CO + 2H_2$$

Dry reforming involves the creation of hydrogen and carbon monoxide in the absence of water, for example using carbon dioxide. An example of the dry reforming reaction is depicted in the following reaction:

$$CH_4 + CO_2 \rightarrow 2CO + 2H_2$$

As previously stated, the reformer system, as well as several other downstream automotive systems, can operate at elevated temperatures. Consequently, in order to start up these catalytic systems (e.g., the reformer system, a fuel cell, a waste energy recovery burner device, a catalytic after treatment system, a burner, a fuel fired heater device, a catalytic heat exchanger, and other treatment devices, as well as combinations comprising at least one of these systems), a micro-reformer can be employed. The micro-reformer, which can be a reformer, or catalytic or gas phase combustor, is preferably an exothermic partial oxidation reformer. Since this micro-reformer produces heat and a reformate, the combination can be employed to heat or otherwise bring the various systems up to the desired temperature.

The micro-reformer is sized to provide sufficient heat (in a full combustion mode) and sufficient reformate (in the reforming mode) to pre-heat and start-up the downstream device in the desired period of time. The micro-reformer is generally a fraction of the size of the downstream device and is preferably designed differently than a main reformer. A micro-reformer can utilize internal metal parts (e.g., heating elements) while internal ceramic parts are preferred for a main reformer because of the continuous high operating temperatures. Consequently, the normal operating temperature for a micro-reformer is less than a main reformer (i.e., about 825° C. vs. about 950° C.). In the case where a main reformer is utilized, there is about a four to one ratio in catalyst volume of a reformer to a micro-reformer (i.e., the catalyst volume of the micro-reformer can be about 50% or less of the size of the main reformer, with a catalyst volume of about 35% or less of the main reformer useful in some applications, and catalyst volumes of about 25% down to about 10% or so of the size of the main reformer preferred in some applications).

The micro-reformer can have a vaporizer, an inline element that transfers thermal energy to the fuel and air in the flow stream of the fuel/air mixture, and a preheater disposed upstream of a catalyst. In operation, a supply of fuel and a supply of air enter the micro-reformer and become mixed. The fuel air mixture passes over and contacts a vaporizer, and gains thermal energy. The fuel/air mixture then moves downstream of the vaporizer to a mixing zone to become more thoroughly mixed. The fuel/air mixture contacts the catalyst and reacts to be converted into preheated reformate. The preheated reformate is then discharged from the micro-reformer.

Figure 2:
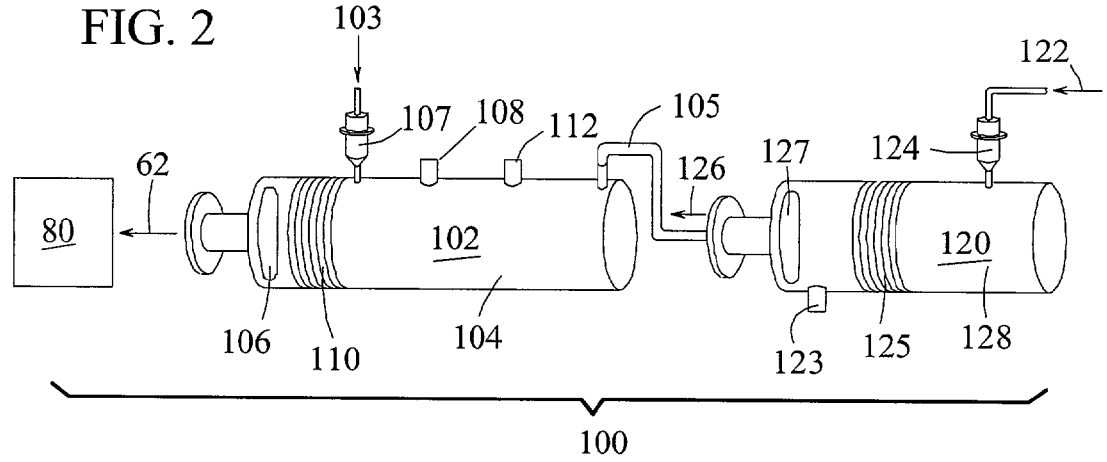
FIG. 2 is a side view of an exemplary fuel reformer system.

Referring to FIG. 2, an example of using a micro-reformer is illustrated. Basically, fuel via fuel injector 124, and air, via air intake valve 123, can be introduced to the catalyst 128 within the micro-reformer 120. Reformate 62, which enters a fuel cell stack 80, can be a product of the reformer system 100. The fuel reformer system 100 has a pre-reformer (or micro-reformer) 120 that can be coupled to a combustor (or main reformer) 102, or it can be coupled to an after-treatment (or downstream) device (not shown). Since the main reformer 102 is a large device, it is difficult, time consuming, and inefficient to heat up in order to provide a rapid supply of reformate 62 to the fuel cell stack 80. Therefore, the micro-reformer 120 is employed to provide a supply of pretreated reformats 126 to the main reformer 102 which burns this pretreated reformate 126 to rapidly bring the main reformer 102 (and/or after-treatment device) to the desired temperature. At ambient temperature, the micro-reformer generally takes less than one minute to about 5 minutes to heat up, dependent upon the size of the micro-reformer and power supplied to the micro-reformer. As discussed below, the micro-reformer can also be maintained at an intermediate temperature to provide an instant source of reformate.

Operation of one embodiment of this system comprises introducing fuel to the micro-reformer 120 for processing before entering the main reformer 102, as illustrated by arrow 122. The fuel 122 is supplied to the micro-reformer 120 through a fuel injector 124. An optional desulphurization element 127 may also be employed, for example, if the fuel is rich in sulfur, or if the catalyst employed in the SOFC is particularly intolerant to sulfur, such as nickel-based catalysts. Once added to the micro-reformer 120, the fuel 122 can be combined with air (or oxygen) from an air inlet (or air intake valve) 123. Since operation of the micro-reformer 120 (i.e., light-off of the catalyst therein) requires the catalyst to reach a certain temperature (e.g., typically at least about 300° C.), the micro-reformer 120 is pre-heated. Heating the micro-reformer can be accomplished via an electrical heating element 125, by heating the incoming air at or before the air intake valve 123, preheating the fuel, introducing and burning fuel in the micro-reformer, or other conventional heating methods, as well as combinations comprising at least one of the foregoing techniques.

Once the micro-reformer 120 has attained operating temperature, both fuel, via fuel injector 124, and air, via air intake valve 123, can be introduced to the catalyst 128 within the micro-reformer 120. The catalyst 128 can be any catalyst capable of reforming the particular fuel to hydrogen, including, but not limited to, rhodium, platinum, palladium, and the like, and oxides and mixtures comprising at least one of the foregoing catalysts.

Within the micro-reformer 120, the fuel reacts with the air in an exothermic reaction to produce hydrogen and byproducts. Due to the exothermic reaction, the pretreated reformate 126 can have a temperature of about 650° C. to about 900° C., with about 750° C. to about 800° C. preferred. A heat exchanger may be utilized to reduce the temperature of the micro-reformer effluent for compatibility with the desired inlet temperature of the downstream devices.

When the micro-reformer is maintained at or near full operating temperature (i.e., at about 650° C. to about 1,000° C., with about 750° C. to about 800° C. preferred) with a very low flow rate of fuel and air, the reformate from this process can be directed through the main reformer (or other downstream device). This flow of reformats will keep the main reformer (or other downstream device) at a threshold (e.g., standby or intermediate) temperature where hydrogen and carbon monoxide will aggressively react (e.g., at about 200° C. to about 400° C., with about 250° C. to about 300° C., preferred). Under these conditions, the startup of the reformer (or other downstream device) can be essentially instantaneous. By increasing the flow rate in the micro-reformer, and adding air and then a fuel, in the main reformer, the system produces a high flow rate of reformate within a short period of time (i.e., a few seconds).

Following processing of the fuel 122 in the micro-reformer 120, the hot pretreated reformate 126 can be directed to the main reformer 102 through piping 105. Within the main reformer 102, the pretreated reformate can be burned to heat the catalyst to its light-off temperature. Once the desired temperature has been attained, the flow of pretreated reformate 126 can optionally be stopped, or partially or wholly, diverted to another automobile system (e.g., an after treatment, downstream, or vehicle device). Meanwhile, an optional desulphurization element 106 may also be installed to remove any unwanted contaminants.

As with the micro-reformer 120, the reformer 102 can be any type of reformer. Here, however, a steam reformer is preferred since it produces a greater amount of SOFC fuel per unit of pre-reformed fuel than the partial oxidation reformer (e.g., twice as much hydrogen is produced from the same quantity of fuel). Steam can be introduced to the reformer through steam input 112. Fuel 103, via fuel injector 107, and air, via air intake valve 108, can be introduced to the catalyst 104. Within the main reformer 102, catalysts react with the unreformed fuel with water to produce hydrogen and carbon monoxide. The main reformer 102 catalyst 104 can be any of the catalysts useful in the micro-reformer.

Optionally, to maintain the desired temperature of the main reformer 102, the catalyst 104 can optionally be heated from an igniter (not shown), and/or a heating device can be employed. The base temperature of the main reformer 102 is increased by the presence of the pretreated reformate 126 created in the micro-reformer, and optionally by heating element 110. The main reformer 102 typically operates at temperatures of about 650° C. to about 1,000° C., with about 800° C. to about 900° C. preferred.

Although the micro-reformer has been described for use with a main reformer coupled to a fuel cell, specifically a SOFC, the micro-reformer can also be utilized to heat up any applicable after-treatment (or downstream or vehicle) device. For example, the downstream device may include, but is not limited to, catalytic converters, waste energy recovery burner devices, reformer beds, burners, and the like. In operation, the micro-reformer is electrically pre-heated, while a low flow of air is introduced into the micro-reformer. When the micro-reformer inlet temperature is about 140° C. or greater and the micro-reformer catalyst exit temperature is about 300° C. or greater, fuel is added to the micro-reformer. At this point, the amount of fuel is at an equivalence ratio of about 0.4 to about 0.7 (i.e., lean of stoichiometric). Under normal operating conditions, the air to fuel equivalence ratio is 14.6 to 1 (i.e., the stoichiometric point). Therefore, an equivalence ratio of less than 1 is fuel lean, while an equivalence ratio of greater than 1 is fuel rich.

When the micro-reformer catalyst exit temperature is about 500° C. or greater, the amount of fuel added to the micro-reformer is increased to rich conditions (i.e., an equivalence ratio of about 2.7 to about 2.9). At this point, the reformer is creating reformate, that is directed through the downstream device and is either burned in that device or is directed to the waste energy recovery unit to be burned. The reformats created is generally comprised of hydrogen and carbon monoxide which burns clean, having little to no emissions.

Since the micro-reformer is operating, the temperature of the micro-reformer is stable while the flow of reformate heats the downstream device. This heating of the downstream device allows for a faster startup from cold start or allows for the downstream device to be in a standby condition. As the downstream device is heated, to an inlet temperature of about 215° C. or greater, air is introduced into the downstream device with the heated reformate. The reformate and air will burn in the catalyst zone of the downstream device. The reformate heats the downstream device, in preparation for the introduction of fuel, in order to prevent the sooting of the catalyst. When the downstream device catalyst exit temperature is about 500° C. or greater, fuel is introduced into the downstream device at an equivalence ratio of about 1.8 to about 2.2. At the same time, the concentration of air in the downstream device is decreased. At this point, both the micro-reformer and the downstream device are in operation.

Employment of the micro-reformer enables the use of heavier weight hydrocarbons without causing system coking, reduces or eliminates the need for stored hydrogen to heat the main reformer, and reduces the amount of electrical energy needed at start-up. The use of the micro-reformer is energy efficient and cost effective, providing reduced start-up times from cold start and standby modes.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of main reformer startup, comprising:
   introducing a first supply of fuel and a first supply of air into a micro-reformer to produce a heated reformate in said micro-reformer;
   directing said heated reformate through a main reformer to heat said main reformer;
   burning at least a portion of said heated reformate in said main reformer;
   increasing said first supply of fuel and said first supply of air to said micro-reformer to increase the amount of heated reformate directed to said main reformer; and
   introducing a second supply of fuel and a second supply of air to said main reformer to produce a main supply of reformate.

2. The method of claim 1, further comprising electrically pre-heating said micro-reformer.

3. The method of claim 2, wherein said micro-reformer has an inlet air temperature at about 140 ° C. or greater and a catalyst exit temperature of about 300 ° C. or greater.

4. The method of claim 1, wherein said micro-reformer has a catalyst volume of about 50% or less of a catalyst volume of said main reformer.

5. The method of claim 4, wherein said micro-reformer has a catalyst volume equal to about 35% or less of a catalyst volume of said main reformer.

6. The method of claim 4, wherein said micro-reformer has a catalyst volume equal to about 25% to about 10% of a catalyst volume of said main reformer.

7. The method of claim 1, wherein said main reformer consists essentially of a catalyst and ceramic components.

8. The method of claim 1, wherein said first supply of fuel has an equivalence ratio of about 0.4 to about 0.7.

9. The method of claim 1, wherein said increasing said first supply of fuel is to an equivalence ratio of about 2.7 to about 2.9.

10. The method of claim 9, wherein said micro-reformer has a catalyst exit temperature of about 500 ° or greater.

11. The method of claim 1, wherein said second supply of fuel has an equivalence ratio of about 1.8 to about 2.2.

12. The method of claim 11, wherein said main reformer has catalyst exit temperature of about 500 ° C. or greater.

* * * * *